(12) United States Patent
Cho et al.

(10) Patent No.: US 12,430,818 B2
(45) Date of Patent: Sep. 30, 2025

(54) ELECTRONIC DEVICE AND METHOD OF DISPLAYING VISUAL INFORMATION IN THEME CONTENT

(71) Applicant: Samsung Electronics Co., Ltd., Suwon-si (KR)

(72) Inventors: Bongje Cho, Suwon-si (KR); Heungkyo Seo, Suwon-si (KR); Sukin Jung, Suwon-si (KR); Sojeong Cha, Suwon-si (KR); Yeunwook Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 191 days.

(21) Appl. No.: 18/105,418

(22) Filed: Feb. 3, 2023

(65) Prior Publication Data

US 2023/0186530 A1  Jun. 15, 2023

Related U.S. Application Data

(63) Continuation of application No. PCT/KR2021/010266, filed on Aug. 4, 2021.

(30) Foreign Application Priority Data

Aug. 4, 2020 (KR) .......... 10-2020-0097174

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01); *G06T 2200/24* (2013.01); *G06T 2207/10024* (2013.01)

(58) Field of Classification Search
CPC ......... G06T 11/001; G06T 11/40; G06T 7/90; G06T 2200/24; G06T 2207/10024;
(Continued)

(56) References Cited

U.S. PATENT DOCUMENTS 10,319,116 B1   6/2019 C et al.
10,572,232 B2   2/2020 Liu et al.
(Continued)

FOREIGN PATENT DOCUMENTS

JP   2005045446 A   2/2005
JP   4391434 B2   12/2009
(Continued)

OTHER PUBLICATIONS

International Search Report and Written Opinion for International Application No. PCT/KR2021/010266; International Filing Date Aug. 4, 2021; Date of Mailing Nov. 5, 2021; 46 Pages.
(Continued)

*Primary Examiner* — Chante E Harrison
(74) *Attorney, Agent, or Firm* — CANTOR COLBURN LLP

(57) ABSTRACT

An electronic device according to various embodiments includes a display, a processor, and a memory. Based on a determination that a theme of the electronic device is applied, the memory may store instructions that, when executed, control the processor to receive a content display request. Based on a determination that the content includes a first object stored with an individual custom color value, convert a color value of the individual custom color to a spatial value by comparing spatial distances between each color included in a standard color chart stored in the memory on the basis of the converted spatial value, standardize by a color value positioned at the smallest distance, and retrieve the first object of the individual custom color in the stan-
(Continued)

dardized color value to display the first object of the individual custom color on the display.

19 Claims, 8 Drawing Sheets

(58) Field of Classification Search
CPC ........ G06T 11/00; G06T 11/60; G06F 3/0481; G06F 3/0484
See application file for complete search history.

(56) References Cited

U.S. PATENT DOCUMENTS

| | | |
|---|---|---|
| 2005/0018226 A1 | 1/2005 | Chiba |
| 2006/0206590 A1 | 9/2006 | Wakasa et al. |
| 2007/0220039 A1 | 9/2007 | Waldman et al. |
| 2013/0031468 A1 | 1/2013 | Lee et al. |
| 2013/0205238 A1 | 8/2013 | Zurmuehl et al. |
| 2014/0237429 A1* | 8/2014 | Abrahami ............. G06T 11/001 715/835 |
| 2014/0362105 A1 | 12/2014 | Kocienda et al. |
| 2014/0365965 A1 | 12/2014 | Bray et al. |
| 2016/0246475 A1 | 8/2016 | Garcia et al. |
| 2017/0047019 A1 | 2/2017 | Li et al. |
| 2017/0099602 A1 | 4/2017 | Joo et al. |
| 2017/0360295 A1 | 12/2017 | Oz et al. |
| 2019/0340791 A1* | 11/2019 | Hill ............................ G06F 8/38 |
| 2020/0027249 A1 | 1/2020 | Loughry et al. |
| 2020/0278787 A1 | 9/2020 | Wan et al. |
| 2021/0158572 A1 | 5/2021 | Ko et al. |
| 2023/0316368 A1* | 10/2023 | Itaenen ..................... G06T 7/90 382/165 |
| 2023/0362293 A1* | 11/2023 | Gao .................. H04M 1/72427 |

FOREIGN PATENT DOCUMENTS

| | | |
|---|---|---|
| JP | 2013205762 A | 10/2013 |
| KR | 101091241 B1 | 12/2011 |
| KR | 20120050158 A | 5/2012 |
| KR | 20130012288 A | 2/2013 |
| KR | 20170040872 A | 4/2017 |
| KR | 102094780 B1 | 3/2020 |
| KR | 102311530 B1 | 10/2021 |
| KR | 102402378 B1 | 5/2022 |

OTHER PUBLICATIONS

Korean Office Action corresponding to Application No. 10-2020-0097174; Dated Jan. 14, 2025.

* cited by examiner

ELECTRONIC DEVICE AND METHOD OF DISPLAYING VISUAL INFORMATION IN THEME CONTENT

CROSS-REFERENCE TO RELATED APPLICATIONS

This application is a continuation of International Application No. PCT/KR2021/010266 designating the United States, filed on Aug. 4, 2021, in the Korean Intellectual Property Receiving Office and claiming priority to Korean Patent Application No. 10-2020-0097174, filed on Aug. 4, 2020, in the Korean Intellectual Property Office, the disclosures of all of which are incorporated by reference herein in their entireties.

BACKGROUND

Various embodiments of the disclosure relate to an electronic device and a method of displaying visual information in theme content.

An electronic device may display various screens using a display. Although electronic devices display graphic user interface (GUI) elements using limited colors specified in the electronic devices, the electronic device may support expression by designating specific colors in an infinite color range, instead of the limited colors in some functions (or applications) such as notes, memos, drawing, and painting.

The electronic device may change a GUI theme for screen configuration and support, among them, a dark color theme (dark mode or color inversion mode) as default to reduce eye fatigue of the user and save battery life. In the dark color theme, a background image is expressed in black color and the colors of the GUI elements are inverted to be displayed (e.g., black text↔white text). In this case, when applying a dark color theme, the electronic device performs color inversion, based on pre-defined colors, that is, based on a color table specified in the system.

SUMMARY

The dark color theme may be applied collectively through system configuration, but the dark color theme is not applied to some content. For example, in the case of content that is able to be expressed using colors in an infinite range, instead of colors included in a limited color table, it is difficult for the electronic device to implement a change system for infinite colors, so the color theme change is not applied thereto and content is displayed in a default theme (light color theme) in which black text is displayed on a white background. In particular, the dark color theme is not applied to content enabling a drawing environment, such as an electronic document, an electronic note, or an electronic memo.

For this reason, in order to support a dark theme, a user may select only a simple color included in a limited color table for drawing, or the user may have to change a color as a dark background for each piece of content one by one.

An electronic device according to various embodiments includes a display, a processor, and a memory, wherein when a theme of the electronic device is applied, the memory may store instructions that, when executed, control the processor to: on the basis of receiving a content display request, when content includes a first object stored with an individual custom color value, convert a color value of the individual custom color to a spatial value; and by comparing spatial distances between each color included in a standard color chart stored in the memory on the basis of the converted spatial value, standardize by a color value positioned at the smallest distance; and summon the first object of the individual custom color in the standardized color value to display the individual custom color in the standardized color on the display.

A method according to various embodiments includes receiving a request for displaying content in case of applying a color theme to the electronic device, based on the reception, in case that visual information to be displayed on a display comprises a first object stored with an individual custom color value, converting the stored individual custom color value into spatial data, comparing the spatial data with spatial distances between respective colors included in a standard color chart specified in the electronic device to standardize the same with a color value located at a smallest distance to the individual custom color; and retrieving the first object with the standardized color value and displaying the first object with the standardized color value on the display.

An electronic device according to various embodiments may support a dark color theme for content, an electronic document, or an application capable of being expressed in colors of an unlimited range without color restrictions by performing inversion to an optimal color suitable for each color, instead of changing information.

An electronic device according to various embodiments may output, in a dark color theme, content capable of being expressed in colors of an unlimited range without color restrictions, such as electronic notes, electronic documents, and electronic memos, and applications (or a specific area), which do not support the dark color theme, as well as a theme of a common section or a fixed area.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
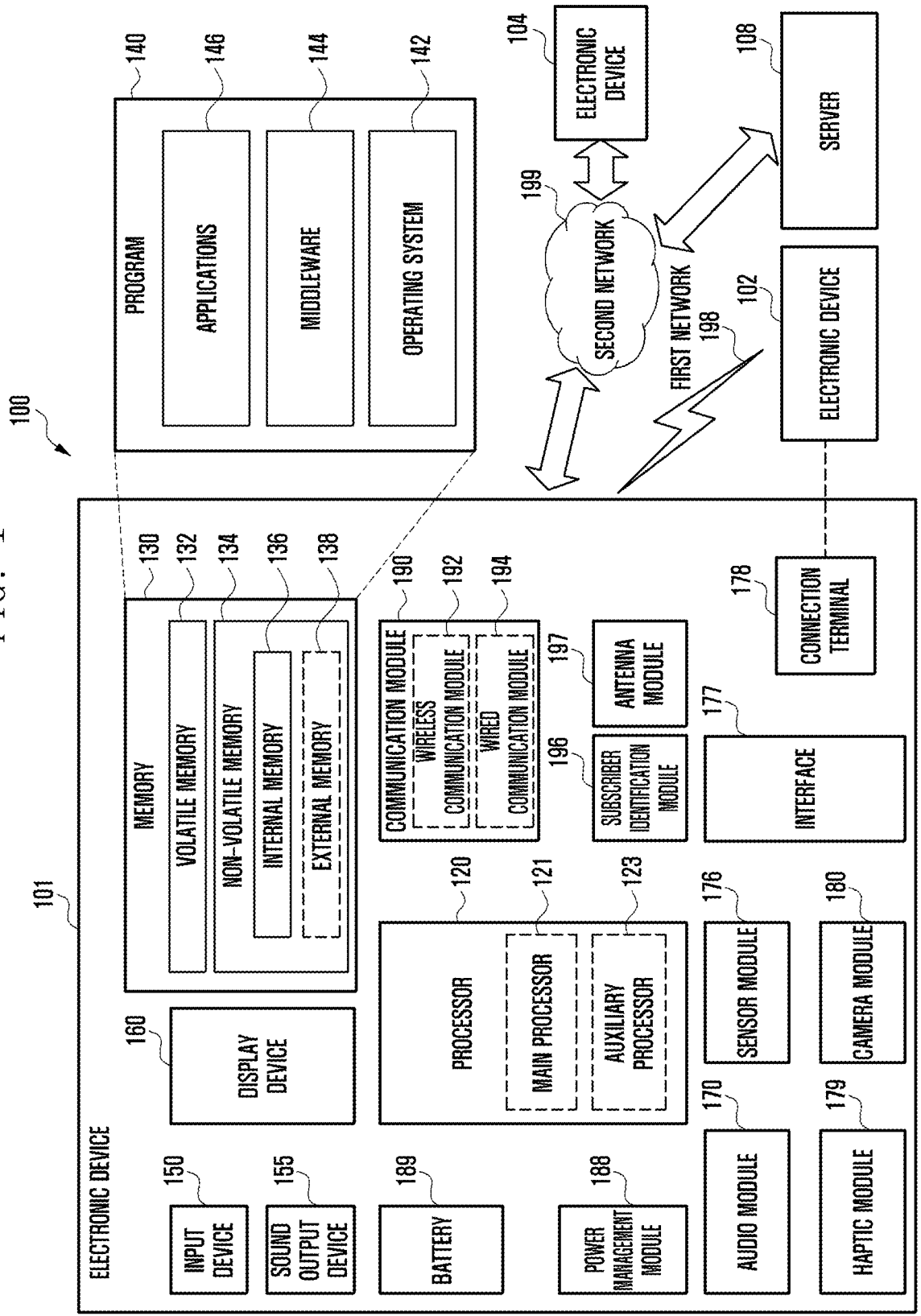
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector.

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
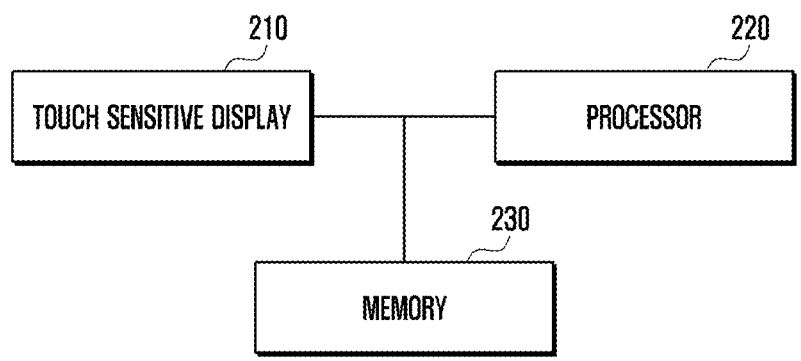
FIG. 2 illustrates configuration of an electronic device according to an embodiment.

FIG. 2 illustrates configuration of an electronic device according to an embodiment.

Referring to FIG. 2, an electronic device (e.g., the electronic device 101 in FIG. 1) according to an embodiment may include a touch sensitive display 210, a processor 220, and a memory 230, and various embodiments of the disclosure may be implemented even if at least some of the illustrated elements are omitted or substituted. The electronic device 101 may further include at least some of the configurations and/or functions of the electronic device 101 in FIG. 1 in addition to the illustrated configurations.

The touch sensitive display 210 may include an input/output device that performs an input function and a display function. The touch sensitive display 210 may include at least some of the configurations of the display module 160 in FIG. 1 and/or the functions of the input module 150 in FIG. 1. The touch sensitive display 210 may include a touch sensor configured to detect a touch or a pressure sensor configured to measure the strength of a force generated by the touch. The touch sensitive display 210 may include an electromagnetic induction panel (or a digitizer panel) capable of electromagnetically communicating with a stylus pen.

The touch sensitive display 210 may display graphic user interface (GUI) elements and/or visual information (e.g., text, graphics, images, videos, or a combination thereof) according to a control signal of the processor 220.

The touch sensitive display 210 may provide a user with a drawing environment capable of drawing using a finger or stylus pen. For example, the touch sensitive display 210 may provide a drawing tool or a drawing board to the user through a drawing application (e.g., a note application, a memo application, a drawing application, or a painting application) (hereinafter, a drawing application).

The processor 220 may be an element capable of performing operations or data processing related to the control and/or communication of respective elements of the electronic device 101 and include at least some of the configurations and/or functions of the processor 120 in FIG. 1. According to some embodiments, the processor 220 may include an application processor and/or a display processor.

The memory 230 may be operatively and/or electrically connected to the processor and may store various instructions that may be executed in the processor. The instructions may include control commands such as arithmetic and logical operations capable of being recognized by the processor 220, data transfer, and/or input/output.

The memory 230 may store a drawing application or program. The drawing application may provide the user with a drawing environment in which the user may perform drawing by selecting input tools and colors. For example, the drawing application may provide a GUI for controlling the shape, size, and/or color of the input tool. The memory 230 may store at least one or more standard color charts (color tables or color systems). The standard color chart may be comprised of a limited number of sample colors. For example, if the standard color chart is configured as a 13*13 grid, the standard color chart may include 169 colors. The standard color chart may be updated to have an N*N grid.

According to an embodiment, the processor 220 may execute software stored in the memory 230, for example, a drawing application, to control operations or functions related to the drawing application. The processor 220 may receive a drawing input of the user through the touch sensitive display 210. The processor 220 may record the drawing input, thereby producing and storing drawing information (or drawing content). The drawing content may include at least one of an electronic document, an electronic note, an electronic memo, and/or a drawing image. When producing the drawing information (or drawing content), the processor 220 may store attribute information of a drawing tool applied to the drawing content. For example, the processor 220 may store, in the memory 230, attribute information such as the type of a tool used in producing drawing content, the width of a line drawn on a drawing board, the color of the line, the saturation of the line, and the brightness of the line. For example, the processor 220 may store colors related to drawing input as color values (e.g., RGB (red, green, and blue) code values), but not limited thereto, and store the same as HSV (hue, saturation, and value), HSL (hue, saturation, and lightness), CMYK (cyan, magenta, yellow, and black), HWB (hue, whiteness, and blackness), hexadecimal values (hexadecimal colors), or RGBA (rgb alpha) values.

As an example, the processor 220 may provide a user interface for taking notes on the touch sensitive display 210 in response to a request for taking notes and receive a drawing input from the user, thereby producing an electronic note. The processor 220 may store, in the memory 230, attribute information related to the objects (e.g., text, drawing lines, images, and attached files) included in the electronic note. The processor 220 may store the electronic note in attributes applied to a light color theme.

According to an embodiment, the processor 220 may configure the colors for display configuration to be changed when changing the color theme. For example, the electronic device 101 may configure a first color theme (e.g., a light color theme) as default. If the processor 220 receives a request for changing to a second color theme (e.g., a dark color theme), that is, an input of selecting dark theme application from system configuration options, the processor 220 may configure GUI elements or a screen using colors applied to the dark color theme. For example, the color themes may include a light color theme and a dark color theme, but may also be referred to as another terminology.

The light color theme may be a mode in which a background image is expressed in a light color and in which a text/drawing input is expressed in a dark color, and the dark color theme may be a mode in which a background image is expressed in a dark color and in which a text/drawing input is expressed in a light color. According to some embodiments, the electronic device 101 may support other types of color themes in addition to the light color theme and the dark color theme. According to an embodiment, the processor 220 may output an area to which collective change is not applied (that is, an area in which the color change system is not implemented), as well as GUI elements (background, layout, and template), which are collectively changed when changing the theme colors or specified, and a common area (e.g., an indicator area, a home button area, and an icon area), using colors conforming to the changed theme.

According to an embodiment, the processor 220 may also output the content (e.g., an electronic note document area), capable of being expressed in any color obtained from a combination of colors in an unlimited range without color restrictions, using the colors conforming to the changed theme.

According to an embodiment, the processor 220 may apply the light color theme or the dark color theme, based on a single standard color chart.

According to some embodiments, the processor 220 may support different types of color themes between different UI components, contents, or specific categories. For example, the electronic device may apply the first color theme to a background category and apply the second color theme to a configuration option or menu UI category.

According to some embodiments, a plurality of standard color charts may be provided, and the processor 220 may apply the color theme by configuring differently the standard color chart applied to each application or each piece of content. For example, an inversion process and a standardization process may be performed on a text input, based on a first standard color chart, and an inversion process and a standardization process may be performed on a drawing input, based on a second standard color chart.

Hereinafter, the inversion process and the standardization process will be described in detail with reference to FIG. 4.

According to an embodiment, even if a system is configured as the dark color theme, the processor 220 may store, in the memory, an electronic note in the attributes of the light color theme and transmit the same (e.g., a sharing function) to an external electronic device.

As an example, if the user transmits or shares an electronic note produced in an electronic device configured as a system of the dark color theme to or with an external electronic device, the external electronic device may receive the electronic note having attributes of the light color theme. The electronic device 101 and the external electronic device may synchronize and write the electronic note in real time. For example, in the case where the dark color theme is applied to the electronic device 101 and where the light color theme is applied to the external electronic device, the same electronic note may be displayed in the dark color theme in the electronic device 101 and displayed in the light color theme in the external electronic device.

An electronic device 101 according to various embodiments may include a display (e.g., the display module 160 in FIG. 1 or the touch sensitive display 210 in FIG. 2), a processor (e.g., the processor 120 in FIG. 1 or the processor 220 in FIG. 2), and a memory (e.g., the memory 130 in FIG. 1 or the memory 230 in FIG. 2), wherein when applying a theme of the electronic device, the memory may store instructions that, when executed, cause the processor to perform control to convert, based on reception of a request for displaying content, if the content includes a first object stored with an individual custom color value, the color value of the individual custom color into a spatial value, compare the converted spatial value with spatial distances between respective colors included in a standard color chart stored in the memory to standardize the same with a color value located at a smallest distance, and retrieve the first object of the individual custom color with the standardized color value and display the same on the display.

According to various embodiments, the first object of the individual custom color may include one of a drawing object, a text object, and a GUI element stored with a color value newly produced by a combination of colors in a color spectrum, instead of a color value specified in the standard color chart.

According to various embodiments, the memory may further include instructions that cause the processor to divide the standard color chart into a first region, a second region, and a third region if the content includes a second object stored with a color value specified in the standard color chart, display the second object with the stored color value, regardless of a theme, if a color of the second object is included in the second region, and display the second object in a color inverted using color matching according to change of a theme color if the second object is included in the first region or the third region.

According to various embodiments, the memory may further include instructions that cause the processor to retrieve and display a background image of the content with a black color value, instead of a white color value stored in the memory, when the theme changes from a first color theme to a second color theme.

According to various embodiments, the memory may further include instructions that cause the processor to produce content expressed in an individual custom color, based on at least one of an electronic note application, an electronic memo application, an electronic document application, a drawing application, and a painting application, and store, in the memory, the content expressed in the individual custom color in attributes applied to the first color theme.

According to various embodiments, the memory may include instructions that cause the processor to collectively change colors of system GUI elements and a common area, based on a standard color chart corresponding to the second color theme, when configuring the second color theme by system configuration, retrieve the content expressed in the individual custom color using attributes applied to the second color theme, and display the content by standardizing the individual custom color.

According to various embodiments, the dark color theme may be partially applied to or released from the content, based on individual configuration of a specific application that supports expression in colors produced by a combination of colors in an infinite color range, instead of limited colors.

According to various embodiments, the standard color chart may be a color system having an N*N grid, the first region may include light colors of high brightness, the third region may include dark colors of high brightness, and the second region may include standard colors included between the first region and the third region.

According to various embodiments, in the case where a plurality of standard color charts is provided, the memory may further include instructions for applying a color theme conforming to different standard color charts between the contents, applications, and GUI configuration elements.

According to various embodiments, the memory may include instructions that cause the processor to identify, in response to an event for displaying an electronic note including a drawing object, a color theme of the electronic device, if the color theme is a first color theme, display, on the display, the drawing object with a color value stored in the electronic device on a background image of a light color, if the color theme is a second color theme and in the case where the drawing object is stored in a color included in the standard color chart, perform an inversion process based on the standard color chart to display the drawing object in an inverted color, and in the case where the drawing object is stored in an individual custom color not included in the standard color chart, perform a standardization process to retrieve and display the drawing object in a standardized color.

Figure 3:
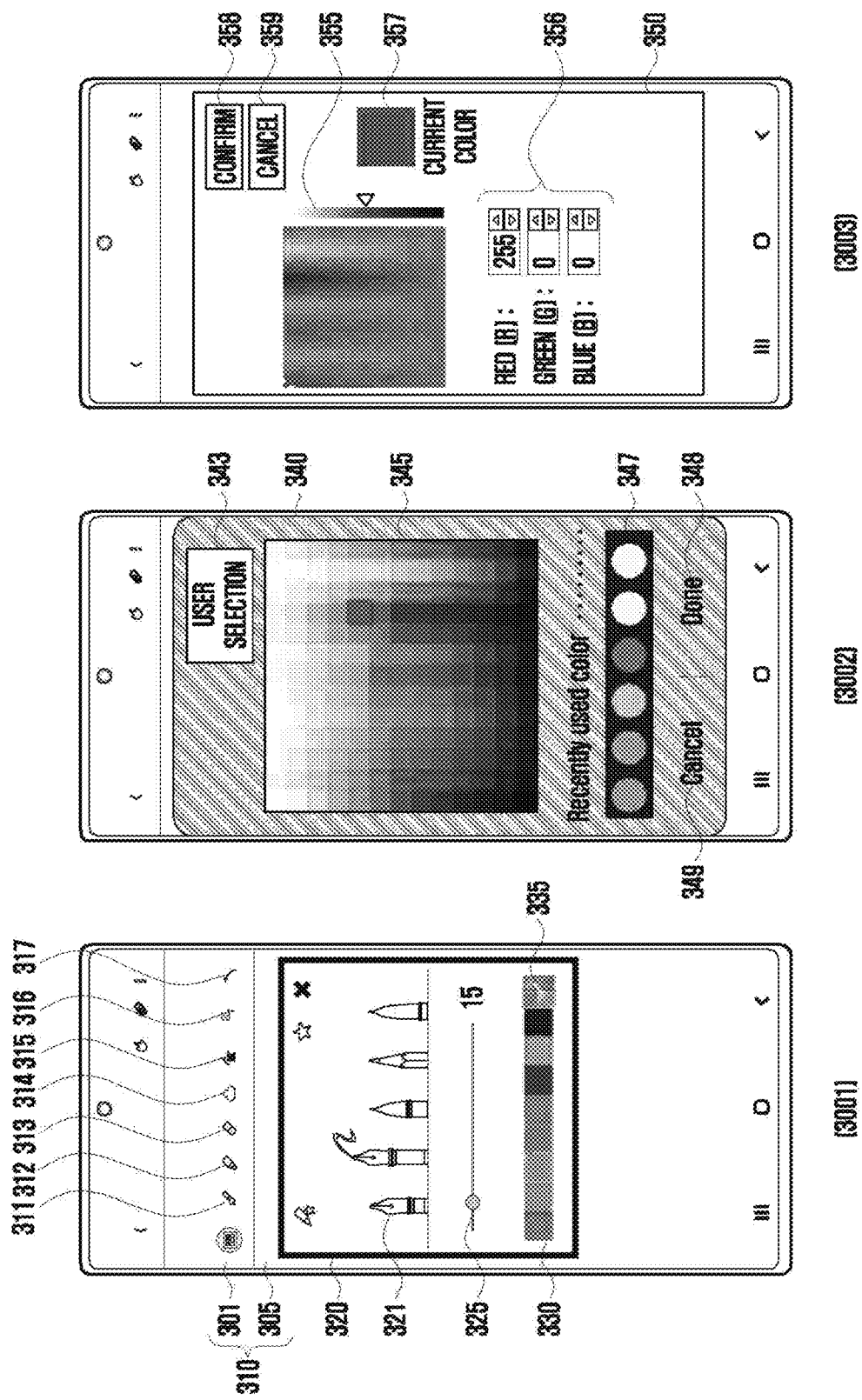
FIG. 3 illustrates a user interface of a drawing environment of an electronic device according to various embodiments.

FIG. 3 illustrates a user interface of a drawing environment of an electronic device according to various embodiments.

Referring to FIG. 3, an electronic device (e.g., the electronic device 101 in FIGS. 1 and 2) according to various embodiments may provide a user with a drawing environment (or a drawing mode or a drawing user interface) by at least one of a drawing input event, a capture event, a touch event, and/or a stylus pen event through a display (e.g., the display module 160 in FIG. 1 or the touch sensitive display 210 in FIG. 2).

According to an embodiment, in the drawing environment, the electronic device 101 may support a function of expressing drawing input and output using individual custom colors by combining colors in an unlimited color space (or color range) in addition to the standard colors stored in the electronic device.

As an example, as shown on device 3001, the electronic device 101 may output, on the display, a first UI 310 including a tool menu area 301 and a drawing area (or a drawing board) 305 in the drawing environment. The tool menu area 301 may include a tool selection item 311 for selecting the type of drawing tool, a tool highlighting selection item 312 capable of highlighting a drawing input, such as a highlighter, an eraser item 313 for erasing a drawing input, an area selection item 314, a sharing item 315, a text input item 316, and/or a re-execution item 317 for re-executing a canceled input, but is not limited thereto.

According to an embodiment, the electronic device 101 may provide a drawing environment in the light color theme as default. The drawing area 305 may be expressed as a white background, and drawing input and output of the user may be expressed in black.

If the tool selection item 311 is selected, the electronic device 101 may display a tool color UI 320 on the display. The user may select the type and color of the tool through the tool color UI 320. The tool color UI 320 may include a tool list 321, a tool size adjustment item 325, a color list 330, and a color addition item 335, but is not limited thereto. The tool color UI 320 may be displayed to overlap at least in part the drawing area or displayed to be reduced at the bottom of the drawing area.

The tool list 321 may display drawing tools. For example, the drawing tools may include various tools for drawing, such as an eraser, pens, pencils, and/or brushes. As an example of these, a tool (e.g., a pen) selected by the user may be displayed visually distinct (e.g., to be enlarged in size) from other tools and displayed as a currently selected tool on the tool selection item 311. The tool size adjustment item 325 may adjust an input width of a selected tool, thereby adjusting the line width according to a drawing input. The color list 330 may display colors (e.g., red, orange, yellow, green, blue, indigo, violet, black, or the like) specified as representative colors in the standard color chart (e.g., a standardized color chart or color system) that is stored in the electronic device 101 or pre-specified.

If the user selects the color addition item 335 (e.g., a tick (v) is displayed on the selected item), the electronic device may display a palette UI 340 on the display as illustrated on device 3002. The palette UI 340 may include a user selection item 343 for color combination based on color spectrums, a standard color chart 345 with a limited color configuration, a recent list 347 displaying recently used colors, a storage item 348 for storing a selected color, and/or a cancel item 349 for canceling a selected color. The standard color chart 345 may be a color chart (color table or color system) stored in the electronic device or pre-specified, may have limited colors (e.g., finite colors), and may be a basic color chart for applying the color theme. For example, the standard color chart 345 illustrated on device 3002 may be configured as a total of 169 colors in a 13*13 grid, but is not limited thereto.

If the user selects the user selection item 343, a color spectrum UI 350 may be displayed along with various colors on the display to adjust the color combination such as the saturation or brightness as illustrated on device 3003. The color spectrum UI 350 may include a color spectrum 355, a color value item, adjustment items 356 for an R value, a G value, and a B value, a user custom color 357, a storage item 358 for storing a selected color, and a cancel item 359 for canceling a selected color, but is not limited thereto. The color spectrum may be a set of colors that support expression in colors of an unlimited range and change the attributes of a color by adjusting a red (R) value, a green (G) value, a blue (B) value, a hue (H) value, a saturation (S) value, a value (V), and/or a lightness (L) value.

The user may select an individual custom color by a combination of colors in the unlimited color space (or color range) through the color spectrum UI 350, instead of the standard color chart, and configure the same as a color for the drawing tool. According to an embodiment, the electronic device 101 may record a drawing input, based on the individual custom color selected or newly combined by the user, and store the same. According to an embodiment, the user may select the individual custom color using a dropper function of directly selecting a desired color from the content (e.g., text or images) and configure the same as a color of the drawing tool.

For example, the user may make a drawing on the drawing area 305 using a stylus pen or his/her finger, and the electronic device 101 may receive the drawing input from the touch sensitive display (e.g., 210 in FIG. 2). The electronic device 101 may display a drawing output on the drawing area 305 according to the drawing input. For example, the electronic device 101 may identify tool attributes (e.g., a tool type, a line width, and a color) and display a drawing output on the drawing area 305 by applying the identified attributes thereto.

According to an embodiment, if the user selects an individual custom color from the color spectrum, the electronic device 101 may store the selected color value as a user custom value in the memory. The electronic device 101 may express a drawing input or text using the color of the user custom value.

According to an embodiment, the electronic device 101 may store the content produced in the drawing environment, such as an electronic note, an electronic document, and an electronic memo, in the attributes of the light color theme (i.e., a background image is displayed in a white color).

According to an embodiment, when applying the dark color theme, the electronic device 101 may perform an inversion process using color matching based on the standard color chart stored in the electronic device 101. In the case of an individual custom color that does not belong to the colors included in the standard color chart when applying the color theme, the electronic device may perform a standardization process, thereby performing conversion of color.

Figure 4:
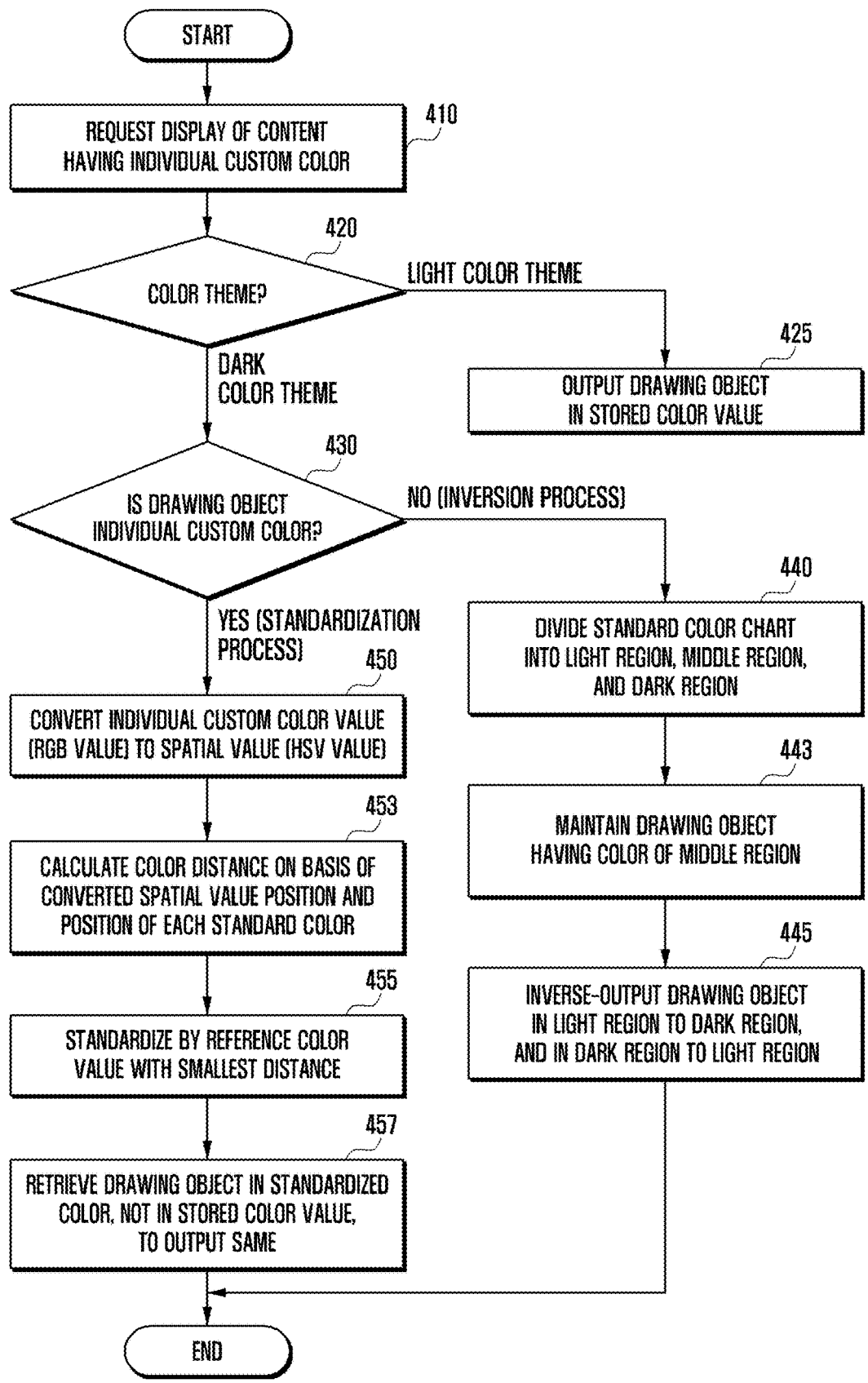
FIG. 4 illustrates a flowchart of a method for obtaining drawing information in a dark color theme of an electronic device according to various embodiments.
Figure 5:
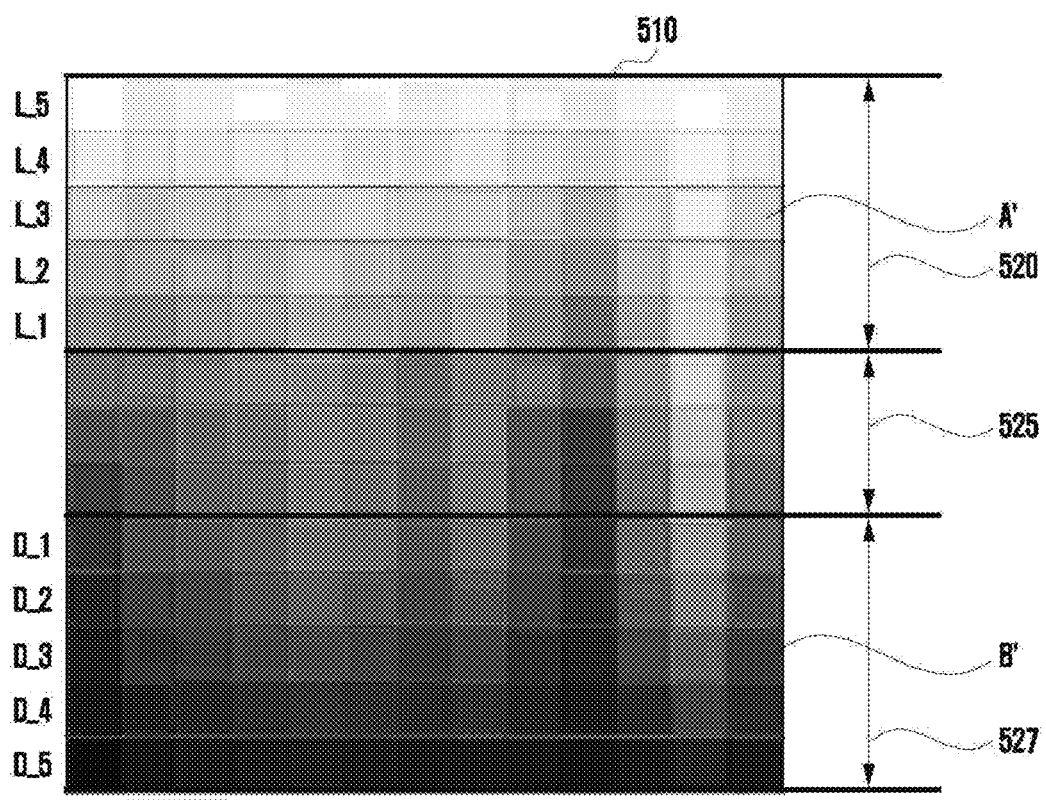
FIG. 5 illustrates an example of a standard color chart according to various embodiments.

FIG. 4 illustrates a flowchart of a method for obtaining drawing information in a dark color theme of an electronic device according to various embodiments, and FIG. 5 illustrates an example of a standard color chart according to various embodiments.

Referring to FIGS. 4 and 5, according to an embodiment, a processor (e.g., the processor 120 in FIG. 1 or the processor 220 in FIG. 2) of an electronic device (the electronic device 101 in FIGS. 1 and 2) may receive a request for displaying drawing content in an individual custom color in operation 410. For example, the processor 220 may receive an electronic note display request. Although FIG. 4 illustrates a drawing object in the description, the embodiment of the disclosure may be applied to the content including text expressed in the individual custom color or GUI elements.

In operation 420, the processor 220 may identify a color theme configured in the electronic device 101. If a first color theme, for example, the color theme, is a light color theme (default theme), the processor 220 may proceed to operation 425 and output the drawing object with a color value stored in a memory (e.g., the memory 230 in FIG. 2). For example, the processor 220 may retrieve an electronic note stored in the attributes of the light color theme, thereby express the background of the electronic note in a white color corresponding to attribute information and outputting the drawing object with the stored color value corresponding to the drawing input.

In operation 430, if the color theme configured in the electronic device 101 is a second color theme, for example, a dark color theme, the processor 220 may identify whether or not the drawing object is of the individual custom color. The processor 220 may identify a color value (color code value) of the drawing object, based on the attribute information of the drawing object, and determine whether or not the color value of the drawing object is included in the standard color chart stored in the memory.

If the drawing object is of the color included in the standard color chart, the processor 220 may perform a specified inversion process, and if the drawing object is of the individual custom color, the processor 220 may perform a standardization process.

The inversion process and the standardization process may be performed independently or separately.

In details of the inversion process, the processor 220 may divide the standard color chart specified in the electronic device into three regions, for example, a light region, a middle region, and a dark region in operation 440.

In operation 443, the processor 220 may maintain the color of the drawing object corresponding to the color of the middle region, and in operation 445, the processor 220 may output the drawing object to be inverted such that the color of the light region changes into the color of the dark region and such that the color of the dark region changes into the color of the light region. Operations 443 and 445 may be performed independently or separately, or at least part of the operations may be omitted.

According to an embodiment, although the electronic device 101 may use the standard color chart 510 illustrated in FIG. 5 as a specified color system, this is only an example. The electronic device 101 may control color matching between a light theme color and a dark theme color, based on the colors included in the standard color chart 510. The standard color chart 510 illustrated in FIG. 5 may be divided into the light region 520, the middle region 525, and the dark region 527, and the middle region 525 may be a reference region for color matching in which the color is maintained regardless of the theme.

According to an embodiment, the processor 220 may perform control such that the colors of the drawing object or GUI elements expressed as the colors included in the middle region 525 are to be maintained, regardless of the theme, and may perform control such that, when the color theme is changed, the drawing object or GUI elements expressed as the colors included in the light region 520 and the dark region 527 are to be output to be inverted in colors matching one to one. According to an embodiment, the light region may be divided into layers of L_1, L_2, L_3, L_4, and L_5, and the dark region may be divided into layers of D_1, D_2, D_3, D_4, and D_5, and when inverting colors, the color may be inverted to the color at the same position in the same layer and displayed. For example, in the case where a drawing object is expressed/stored with a color value of A' in the light color theme, the drawing object may be expressed with a color value of B' one to one matched to the color value of A' in the dark color theme.

According to an embodiment, the processor 220 may invert the color through one-to-one color matching using a hashmap with a key and a value.

In details of the standardization process, in operation 450, if the drawing object is of the individual custom color, the processor 220 may retrieve an individual custom color (RGB value) stored in the memory and convert the color value (RGB value) to a spatial value (HSV value).

According to an embodiment, the processor 220 may perform RGB-HSV conversion on the individual custom color to calculate hue (H), saturation (S), and value (V). For example, the processor 220 may perform the conversion using a function defining a relationship between the RGB value and the HSV value.

According to an embodiment, the spatial value (HSV value) may be expressed in the three-dimensional (X, Y, Z) space, and the colors included in the standard color chart may also be expressed in the three-dimensional (X, Y, Z) space.

In operation 453, the processor 220 may calculate a color distance, based on the color position of the converted spatial value and the position of each color included in the standard color chart. The processor 220 may calculate a one-to-one distance between the position of the converted spatial value and each color included in the standard color chart. For example, the processor 220 may perform three-dimensional mapping on each of the H channel, the S channel, and the V channel in the color of the converted spatial value, thereby calculating the distance.

According to an embodiment, the processor 220 may calculate the one-to-one distance only for the colors within a predetermined distance or range from the position of the color of the converted spatial value.

In operation 455, the processor 220 may perform standardization using a reference color having a smallest distance among the calculated results. The reference color may denote a color that is a target of the color adjustment and may be any one color included in the standard color chart. The processor 220 may identify a value located at the smallest distance from the converted spatial values and convert the same to an RGB value, thereby performing color standardization for the individual custom color. In other words, the standardization process may be a process in which the individual custom color is to be mapped to one of the colors included in the standard color chart.

In operation 457, the processor 220 may retrieve a drawing object having the individual custom color in the standardized color, instead of the stored color value, and output the drawing object.

According to some embodiments, the processor 220 may store the individual custom color, produce a dynamic mapping table for mapping the individual custom color to a color selected by standardization, and update the dynamic mapping table whenever the individual custom color is updated.

A method of displaying visual information in an electronic device 101 according to various embodiments may include receiving a request for displaying content when applying a color theme to the electronic device 101, if visual information to be displayed on a display (e.g., the display module 160 in FIG. 1 or the touch sensitive display 210 in FIG. 2) includes a first object stored with an individual custom color value, based on the reception, converting the color value of the individual custom color into a spatial value, comparing the converted spatial value with spatial distances between respective colors included in a standard color chart specified in the electronic device to standardize the same with a color value located at a smallest distance thereof, and retrieving the first object of the individual custom color with the standardized color value and displaying the first object of the individual custom color with the standardized color on the display.

According to various embodiments, the first object of the individual custom color may be one of a drawing object, a text object, and a GUI element stored with a color value newly produced by a combination of colors in a color spectrum, instead of a color value specified in the standard color chart.

According to various embodiments, the displaying may further include performing at least one of dividing the standard color chart into a first region, a second region, and a third region if the content includes a second object stored with a color value specified in the standard color chart, displaying the second object with the stored color value, regardless of a theme, if a color of the second object is included in the second region, and displaying the second object in a color inverted using color matching according to change of a theme color if the second object is included in the first region or the third region.

According to various embodiments, the standard color chart may be a color system having an N*N grid, the first region may include light colors of high brightness, the third region may include dark colors of high brightness, and the second region may include standard colors included between the first region and the third region.

According to various embodiments, the displaying may further include retrieving and displaying a background image of the content with a black color value, instead of a white color value stored in the memory, when the theme changes from a first color theme to a second color theme.

According to various embodiments, the content may be produced based on at least one of an electronic note application, an electronic memo application, an electronic document application, a drawing application, and a painting application and stored in attributes applied to the first color theme.

According to various embodiments, the color value may be an RGB value and the spatial value may be an HSV value, and the standardizing may include converting an RGB value of the individual custom color to an HSV value by performing RGB-HSV conversion, calculating a one-to-one distance between a position of the converted HSV value and each color included in the standard color chart, identifying a value having a smallest distance from among them, and converting the RGB value of the individual custom color into an RGB value included in a standard color chart.

According to various embodiments, the method may further include, after the displaying, producing a dynamic mapping table for mapping the individual custom color to a color selected by standardization and updating the dynamic mapping table whenever the individual custom color is updated.

According to various embodiments, the displaying may include, in the case where a plurality of standard color charts is provided, displaying the content by applying a color theme conforming to different standard color charts between the contents, applications, and GUI configuration elements thereto.

Figure 6:
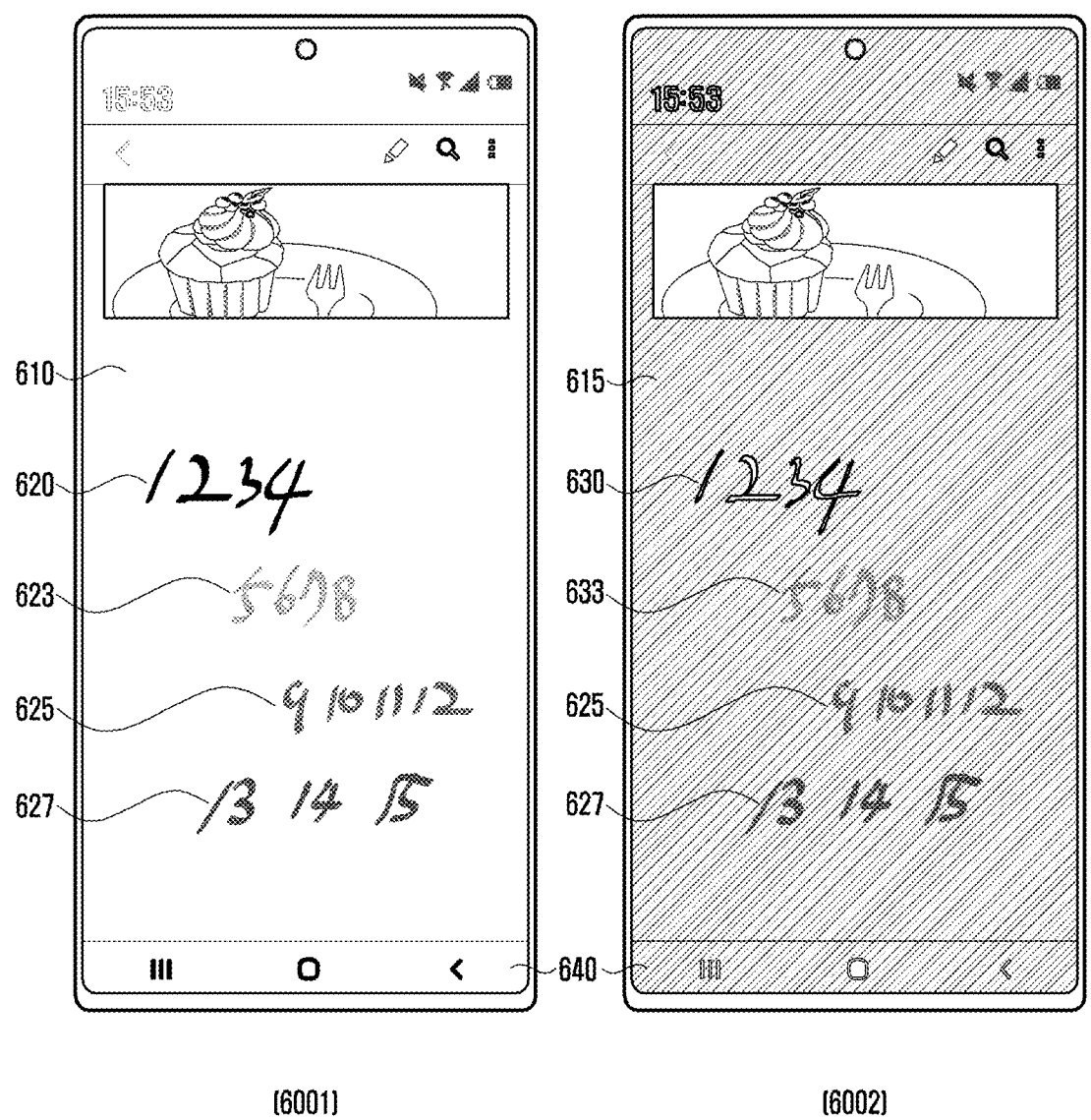
FIG. 6 illustrates color theme application screens of a drawing environment of an electronic device according to various embodiments.

According to various embodiments, the method may further include identifying a color theme of the electronic device in response to an event for displaying an electronic note including a drawing object, if the color theme is a first color theme, displaying, on the display, the drawing object with a color value stored in the electronic device on a background image of a light color, if the color theme is a second color theme and in the case where the drawing object is stored in a color included in the standard color chart, performing an inversion process based on the standard color chart to display the drawing object in an inverted color, and in the case where the drawing object is stored in an individual custom color not included in the standard color chart, performing a standardization process to retrieve and display the drawing object in a standardized color FIG. 6 illustrates color theme application screens of a drawing environment of an electronic device according to various embodiments.

Referring to FIG. 6, according to an embodiment, when changing a theme, the electronic device 101 may perform color standardization on the individual custom color in addition to color inversion using the standard color chart, thereby expressing content from a first color theme (e.g., a light color theme) to a second color theme (e.g., a dark color theme). Screen 6001 may be a screen in which the same electronic note is expressed in the light color theme (default theme), and screen 6002 may be a screen in which the same is expressed in the dark color theme.

According to an embodiment, when a theme is changed, the content area (e.g., an electronic note background image), as well as a common section 640 (e.g., an indicator area and a home button area) applied to the entire electronic device 101, may be expressed in the dark color theme.

As default configuration, the electronic device 101 may apply the light color theme as default to produce drawing content (e.g., an electronic note) in the drawing environment and store the drawing content in the attributes of the light color theme.

According to an embodiment, the electronic device 101 may retrieve the electronic note using attribute information of the light color theme stored in the memory, thereby displaying a background and text/drawing object. For example, in the light color theme, the electronic note may have a white background image 610 as illustrated on screen 6001, and the drawing object may be expressed in various colors according to the user selection. For example, a first drawing object 620 may be expressed in a black color, and a second drawing object 623 may be expressed in an individual custom color obtained through a new combination of colors by the user using a color spectrum. A third drawing object 625 and a fourth drawing object 627 may be expressed in the colors included in the standard color chart provided by the electronic device 101.

According to an embodiment, in the dark color theme, in response to the electronic note activation display, the electronic device 101 may display text/drawing object retrieving the same using a color inverted by color matching, other than stored color attributes, or a color changed by color standardization. The electronic device 101 may display the electronic note with dark color theme attributes according to a theme change request. For example, as illustrated on screen 6002, the electronic note of the dark color theme may have a black background image 615, and the drawing object may be changed to the color conforming to the dark color theme. In the dark color theme, the first drawing object 630 may be inverted to have a white color. Since the second drawing object 633 is not of the color included in the standard color chart, it may be inverted to have a standardized color through color standardization. Since the third drawing object 625 and the fourth drawing object 627 correspond to the colors included in the middle region of the standard color chart, they may be expressed while remaining in the same colors in the light color theme and the dark color theme.

The electronic device 101 may store the electronic note with the attributes of the light color theme in the memory even if the system is configured as the dark color theme. As an example, when the user transmits or shares the produced electronic note to or with an external electronic device, the external electronic device may receive the electronic note having the light color theme attributes.

Figure 7:
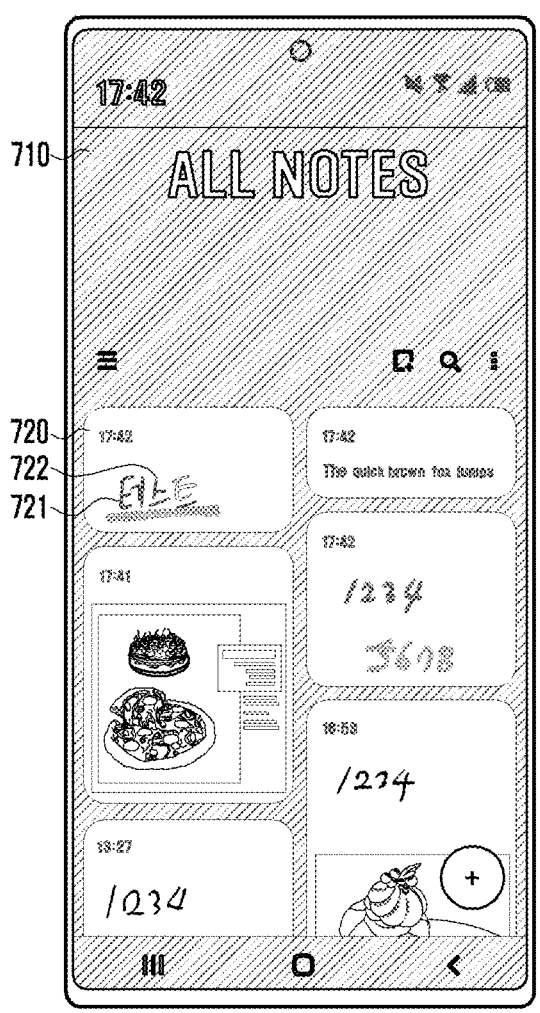
FIG. 7 illustrates color theme application screens of a drawing environment of an electronic device according to various embodiments.
Figure 7:
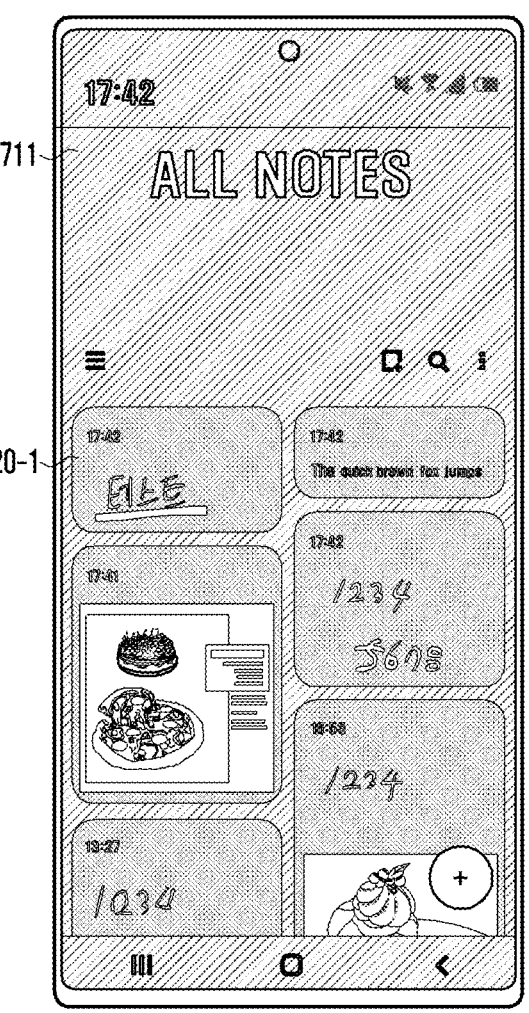

FIG. 7 illustrates color theme application screens of a drawing environment of an electronic device according to various embodiments.

Referring to FIG. 7, an electronic device (e.g., the electronic device 101 in FIGS. 1 and 2) according to an embodiment may execute an electronic note application and display note images (e.g., thumbnails) corresponding to the electronic note on the display. The user may select one of the note images, and the electronic device 101 may display electronic note content (or an electronic note document image) corresponding to the selected note image through a display as illustrated in FIG. 6.

The electronic device 101 may output an area to which collective change is not applied (that is, an area in which the color change system is not implemented), for example, content (e.g., an electronic note document area) capable of being expressed in colors of an unlimited range without color restrictions, as well as GUI elements (background, layout, an indicator area, a home button area, and an icon area) that are collectively changed when changing the dark theme colors or specified by system configuration, in the attributes of the dark color theme.

In the case of a comparative embodiment, as illustrated on screen 7001, it can be seen that even if the dark color theme is configured for the electronic note, an area in which the color is collectively inverted or a note application background image 710, which is a specified GUI element, is inverted to a black color, whereas a note image 720 (e.g., a thumbnail) corresponding to each electronic note and drawing objects 721 and 722 included in the note image are displayed in the light color theme attributes.

On the other hand, as illustrated on screen 7002, it can be seen that an electronic note document area 720-1, as well as a note application background image 711, is inverted to a black color in the electronic note according to the various embodiments provided in this document. It can be seen that the content (e.g., text or images) displayed in the electronic note document area 720-1 is also output in the attributes of the dark color theme in the electronic note according to an embodiment.

Figure 8:
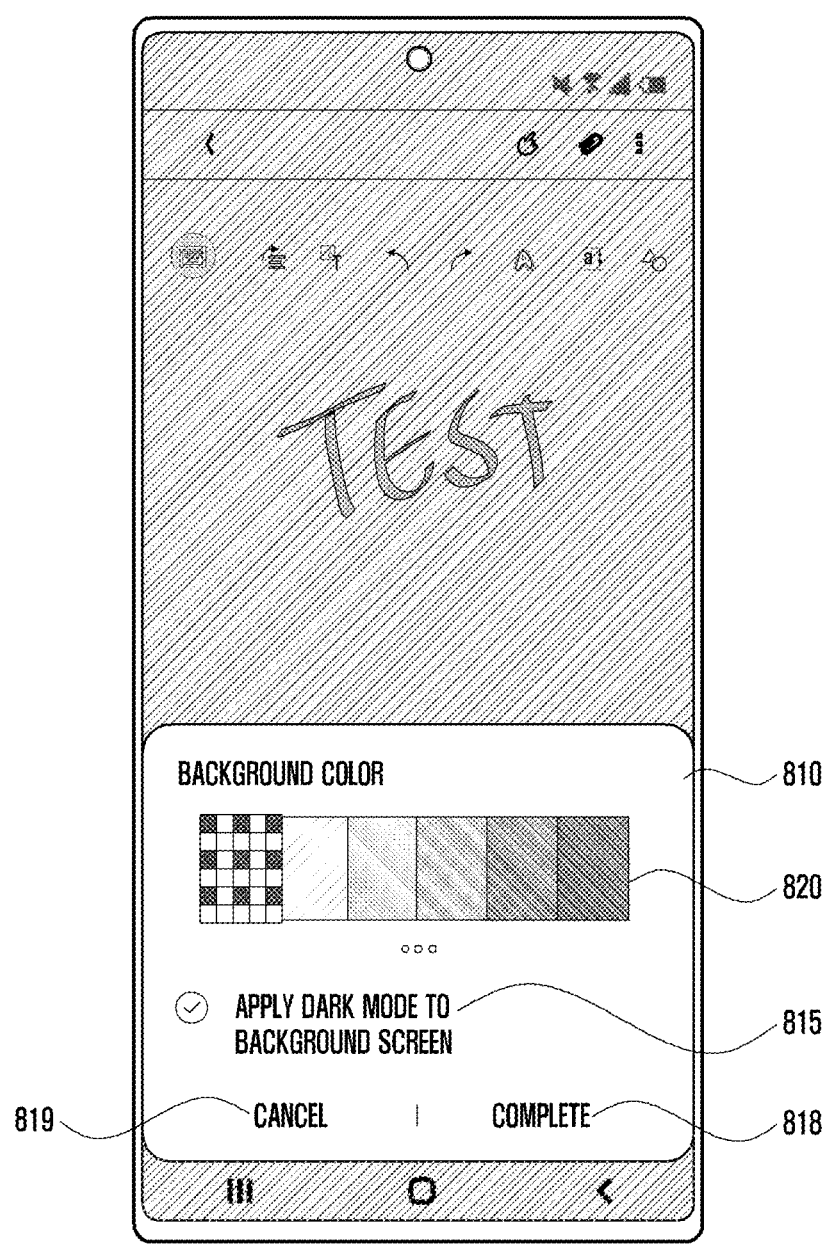
FIG. 8 illustrates a color theme configuration screen of an electronic device according to various embodiments.

FIG. 8 illustrates a color theme configuration screen of an electronic device according to various embodiments.

Referring to FIG. 8, an electronic device 101 according to an embodiment may individually support the application or release of the dark color theme by configuration of a drawing application in addition to the system configuration. The electronic device 101 may support an application configuration option such that the color theme applied by the system configuration is configured not to be applied to the electronic note application.

For example, as illustrated in FIG. 8, the electronic note app may provide a dark color theme (dark mode) configuration option UI 810 to the background screen. The configuration option UI may include a background color list 820, an option configuration item 815, an approval item 818, and a cancellation item 819.

For example, when the dark color theme is applied by the system configuration, the electronic device 101 may output the electronic note application in the dark color theme, and the user may perform configuration through the configuration option UI such that the electronic note document is to be output in a light color background. On the other hand, when the electronic device 101 applies the light color theme according to the system configuration, the user may perform configuration through the configuration option UI such that only the electronic note document is to be output in a dark color background.

Although the color theme is described as the light color theme and the dark color theme in various embodiments, it is not limited thereto. The embodiment of the disclosure may also be applied to a user-specified theme. For example, the user-specified theme may be configured as a color specified by the user. Although the standard color chart specified in the electronic device 101 is described as the light region, the middle region, and the dark region in various embodiments, it is not limited thereto. For example, an area between the light region and the middle region, and an area between the middle region and the dark region may be further added to the standard color chart.

Although the electronic device 101 has a bar type or plate type appearance in various embodiments of this document, the disclosure is not limited thereto. For example, the illustrated electronic device may be some of rollable electronic devices or foldable electronic devices. The "rollable electronic device" may indicate an electronic device in which a display (e.g., the touch sensitive display 210 in FIG. 2) is able to be bent and deformed such that at least a part thereof is wound or rolled or is received inside a housing. The rollable electronic device may expand the display area of the display by unfolding the display or by exposing the display received therein to the outside according to user's need. The "foldable electronic device" may indicate an electronic device capable of being folded such that two different areas of a display face each other or are directed in opposite directions to each other. The display of the foldable electronic device may be folded in a direction in which two different areas face each other in a first state and may be configured such that the two different areas are substantially flat or face in the same direction in a second state.

The electronic device 101 according to various embodiments may be interpreted to encompass various other electronic devices such as notebook computers and home appliances, as well as a portable electronic device such as a smartphone.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device configured to change a color theme of a display comprising:
   the display;
   a processor; and
   memory storing instructions that, when executed by the processor, cause the electronic device to:
   based on a determination that the color theme is applied to the electronic device,
   receive a request for displaying content comprising a first object stored with an individual custom color value, wherein the first object comprises one of a drawing object, a text object, and a GUI element stored with a color value newly produced by a combination of colors in a color spectrum, instead of a color value specified in the standard color chart;
   convert the stored individual custom color value into spatial data;
   compare the spatial data with spatial distances between respective colors included in a standard color chart stored in the memory to standardize the stored individual custom color with a color value located at a smallest distance to the individual custom color;
   retrieve the first object with the standardized color value; and
   display the first object with the standardized color value on the display.

2. The electronic device of claim 1, wherein the instructions that, when executed by the electronic device, cause the electronic device to:
   divide the standard color chart into a first region, a second region, and a third region in case that the content comprises a second object stored with a color value specified in the standard color chart;
   display the second object with the stored color value, regardless of the color theme, in case that a color of the second object is included in the second region; and
   display the second object in a color inverted using color matching according to change of a theme color in case that the second object is included in the first region or the third region.

3. The electronic device of claim 2, wherein the standard color chart is a color system having an N*N grid, wherein the first region comprises light colors of high brightness,
wherein the third region comprises dark colors of high brightness, and
wherein the second region comprises standard colors included between the first region and the third region.

4. The electronic device of claim 3, wherein the instructions that, when executed by the processor, cause the electronic device to, based on a determination that a plurality of standard color charts is provided, apply the color theme conforming to different standard color charts between the contents, applications, and GUI configuration elements.

5. The electronic device of claim 1, wherein the instructions that, when executed by the processor, cause the electronic device to retrieve and display a background image of the content with a black color value, instead of a white color value stored in the memory, based on a determination that the color theme changes from a first color theme to a second color theme.

6. The electronic device of claim 5, wherein the instructions that, when executed by the electronic device, cause the electronic device to produce content expressed in an individual custom color, based on at least one of an electronic note application, an electronic memo application, an electronic document application, a drawing application, and a painting application, and store, in the memory, the content expressed in the individual custom color in attributes applied to the first color theme.

7. The electronic device of claim 6, wherein the instructions that, when executed by the electronic device, cause the electronic device to collectively change colors of system GUI elements and a common area, based on a standard color chart corresponding to the second color theme, when changing into the second color theme by system configuration, retrieve the content expressed in the individual custom color using attributes applied to the second color theme, and display the content by standardizing the individual custom color.

8. The electronic device of claim 1, wherein the instructions that, when executed by the electronic device, cause the electronic device to perform that a dark color theme is partially applied to or is released from the content, based on individual configuration of a specific application that supports expression in colors produced by a combination of colors in an infinite color range, instead of limited colors.

9. The electronic device of claim 1, wherein the instructions that, when executed by the electronic device, cause the electronic device to:
identify, in response to an event for displaying an electronic note comprising a drawing object, a color theme of the electronic device, based on a determination that the color theme is a first color theme, display, on the display, the drawing object with a color value stored in the electronic device on a background image of a light color;
based on a determination that the color theme is a second color theme and in case that the drawing object is stored in a color included in the standard color chart, perform an inversion process based on the standard color chart to display the drawing object in an inverted color; and
based on a determination that the drawing object is stored in an individual custom color not included in the standard color chart, perform a standardization process to retrieve and display the drawing object in a standardized color.

10. A method of displaying visual information in an electronic device by changing a color theme of a display of the electronic device, the method comprising:
receiving a request for displaying content in case of applying the color theme to the electronic device;
based on a determination that visual information to be displayed on the display comprises a first object stored with an individual custom color value, converting the stored individual custom color value into spatial data, wherein the first object comprises one of a drawing object, a text object, and a GUI element stored with a color value newly produced by a combination of colors in a color spectrum, instead of a color value specified in the standard color chart;
comparing the spatial data with spatial distances between respective colors included in a standard color chart specified in the electronic device to standardize the stored individual custom color with a color value located at a smallest distance to the individual custom color;
retrieving the first object with the standardized color value; and
displaying the first object with the standardized color value on the display,
wherein the displaying further comprises retrieving and displaying a background image of the content with a black color value, instead of a white color value stored, based on a determination that the color theme changes from a first color theme to a second color theme.

11. The method of claim 10, wherein the displaying further comprises performing at least one of:
dividing the standard color chart into a first region, a second region, and a third region based on a determination that the content comprises a second object stored with a color value specified in the standard color chart,
displaying the second object with the stored color value, regardless of a theme, based on a determination that a color of the second object is included in the second region, and
displaying the second object in a color inverted using color matching according to change of a theme color based on a determination that the second object is included in the first region or the third region.

12. The method of claim 10, wherein the color value is an RGB value and the spatial value is an HSV value, and
wherein the standardizing comprises converting an RGB value of the individual custom color to an HSV value by performing RGB-HSV conversion, calculating a one-to-one distance between a position of the converted HSV value and each color included in the standard color chart, identifying a value having a smallest distance from among them, and converting the RGB value of the individual custom color into an R'G'B' value included in a standard color chart.

13. The method of claim 10, further comprising:
producing a dynamic mapping table for mapping the individual custom color to a color selected by standardization; and
updating the dynamic mapping table based on a determination that the individual custom color is updated.

14. An electronic device configured to change a color theme of a display comprising:
a display;
a processor; and
memory storing instructions that, when executed by the processor, cause the electronic device to:

based on a determination that a color theme is applied to the electronic device, receive a request for applying the color a theme to content comprising a first object stored with an individual custom color value, wherein the first object comprises one of a drawing object, a text object, and a GUI element stored with a color value newly produced by a combination of colors in a color spectrum, instead of a color value specified in the standard color chart;

convert the stored individual custom color value into spatial value related to a color;

compare the spatial value with spatial distances between respective colors included in a standard color chart stored in the memory to identify a color value located at a smallest distance to the individual custom color;

retrieve the first object with the standardized color value; and control the display to display the first object with the identified color value from the standard color chart when applying the color theme.

15. The electronic device of claim 14, wherein the first object comprises one of a drawing object, a text object, and a GUI element stored with a color value newly produced by a combination of colors in a color spectrum, instead of a color value specified in the standard color chart.

16. The electronic device of claim 14, wherein the instructions that, when executed by the electronic device, cause the electronic device to:

divide the standard color chart into a first region, a second region, and a third region in case that the content comprises a second object stored with a color value specified in the standard color chart;

display the second object with the stored color value, regardless of the theme, in case that a color of the second object is included in the second region; and display the second object in a color inverted using color matching according to change of the theme color in case that the second object is included in the first region or the third region.

17. The electronic device of claim 16, wherein the standard color chart is a color system having an N*N grid, wherein the first region comprises light colors of high brightness, wherein the third region comprises dark colors of high brightness, and wherein the second region comprises standard colors included between the first region and the third region.

18. The electronic device of claim 17, wherein the instructions that, when executed by the processor, cause the electronic device to, based on a determination that a plurality of standard color charts is provided, apply a color theme conforming to different standard color charts between the contents, applications, and GUI configuration elements.

19. The electronic device of claim 14, wherein the instructions that, when executed by the electronic device, cause the electronic device to retrieve and display a background image of the content with a black color value, instead of a white color value stored in the memory, based on a determination that the color theme changes from a first color theme to a second color theme.

* * * * *